United States Patent [19]

Go

[11] 4,098,769

[45] Jul. 4, 1978

[54] LINEAR COPOLYESTERS

[75] Inventor: Santos W. Go, Toledo, Ohio

[73] Assignee: Owens-Illinois, Inc., Toledo, Ohio

[21] Appl. No.: 812,922

[22] Filed: Jul. 5, 1977

Related U.S. Application Data

[63] Continuation-in-part of Ser. No. 690,484, May 27, 1976, abandoned.

[51] Int. Cl.$^2$ ............................................. C08G 63/18
[52] U.S. Cl. ..................................................... 528/99
[58] Field of Search ................................ 260/49, 47 C

[56] References Cited

U.S. PATENT DOCUMENTS 2,593,411  4/1952  Caldwell ............................... 260/75

Primary Examiner—Lester L. Lee
Attorney, Agent, or Firm—Charles S. Lynch; E. J. Holler

[57] ABSTRACT

Linear copolyesters formed from (A) isophthalic acid and, optionally, terephthalic acid and (B) bis(4-beta-hydroxyethoxyphenyl) sulfone and ethylene glycol are described. The linear polyesters contemplated have glass transition temperatures higher than that of poly(ethylene terephthalate) and oxygen and $CO_2$ permabilities less than that of poly(ethylene terephthalate).

5 Claims, No Drawings

LINEAR COPOLYESTERS

The present application is related to U.S. application Ser. No. 812,921, and it is a continuation-in-part of application Ser. No. 690,484, filed May 27, 1976 and now abandoned.

The present application is directed to polyester compositions and more particularly to linear copolyester compositions formed from saturated dicarboxylic acids and saturated glycols; yet more particularly, the invention is directed to linear copolyesters formed from isophthalic acid and, optionally, terephthalic acid and bis(4-beta-hydroxyethoxyphenyl) sulfone and ethylene glycol.

Presently there is a strong interest in manufacturing plastic bottles or containers from poly(ethylene terephthalate) which is essentially a homopolymer formed from terephthalic acid and ethylene glycol. Such bottles or containers whether they be oriented or unoriented possess many desirable characteristics but there is a need to provide a polyester composition which will have oxygen and carbon dioxide permeabilities which are lower than that of poly(ethylene terephthalate) and which will have a glass transition temperature higher than that of poly(ethylene terephthalate). Such a polyester would enable containers made therefrom to be much more versatile in their utilization and would allow for the containers to be used to package materials for which the poly(ethylene terephthalate) would not be well suited and also to allow the containers to be subjected to environments, for example high temperatures, to which poly(ethylene terephthalate) may not be subjected, such as in hot filling of foodstuffs in bottles molded from polymers of the present invention.

U.S. Pat. No. 2,593,411 suggests that polyesters may be formed from dicarboxylic acids and from bis(4-beta-hydroxyalkoxyphenyl) sulfones and that mixed polyesters can likewise be obtained by employing such sulfones in combination with other dihydric and polyhydric alcohols. British patent specification No. 678,264 suggests linear polyesters formed from an aromatic dicarboxylic acid and a glycol, e.g. bis(4-beta-hydroxyethoxyphenyl) sulfone. Also in this regard reference may be had to British patent specification No. 1,196,911 which discloses the reaction of ethylene glycol with for example bis(4-chlorophenyl) sulfone and indicates that such materials may be employed in forming polyesters. Vol. 83 of Chemical Abstracts, No. 206808s (1975) discloses polyesters being formed from 4, 4'-biphenyldicarboxylic acid and aliphatic glycols and bis(4-beta-hydroxyethoxyphenyl) sulfone. Similarly Vol. 83 of Chemical Abstracts, Nos. 165136a and 165644q (1975) disclose the use of such hydroxyethoxy sulfones with naphthalene dicarboxylic acids to form polyesters. None of the foregoing are directed to forming polyesters having an oxygen permeability and a carbon dioxide permeability lower than that of poly(ethylene terephthalate) and which have a glass transition temperature higher than that of poly(ethylene terephthalate).

Japanese unexamined (Kokai) patent publication No. Showa 50-51595 (Patent Appl. No. Showa 48-101837) discloses transparent, dimensionally stable, linear polyesters having high glass transition points but has no recognition, or teachings, with regard to oxygen permeability and carbon dioxide permeability. It is taught therein to employ, for example, bis(4-beta-hydroxyethoxyphenyl) sulfone with a diol and a dicarboxylic acid which is primarily terephthalic acid. In order to obtain polyesters suitable for the purposes of this patent application it is taught that, of the dicarboxylic acid used for forming the polyester, over 70 mole percent, and preferably over 80%, should be terephthalic acid and, based on the acid employed, at least 60% and preferably 65–95% should be the described sulfone. A wide variety of optional bifunctional carboxylic acids are set forth from which it is possible to select isophthalic acid. Similarly a wide variety of diols are disclosed, including ethylene glycol.

In accordance with this invention applicant has satisfied the need for low oxygen permeabilities, low carbon dioxide permeabilities, and high glass transition temperatures and provides for polyesters which, as contemplated herein, will have oxygen and carbon dioxide permeabilities lower than that of poly(ethylene terephthalate) and glass transition temperatures higher than poly(ethylene terephthalate). These linear copolyesters are ideally suited for forming clear bottles for packaging carbonated beverages and are the polymeric reaction product of polyester forming reactants consisting essentially of:

(A) isophthalic acid and, optionally, terephthalic acid and, (B) bis(4-beta-hydroxyethoxyphenyl) sulfone and ethylene glycol, the amount of said (A) reactants being between about 40 mole percent to about 100 mole percent, usually 50 mole percent or higher, of isophthalic acid and between about 60 to zero mole percent, usually 50 mole percent or lower, of terephthalic acid, of course, based only on reactants (A) and the amount of the bis(4-beta-hydroxyethoxyphenyl) sulfone being from at least 15, usually 20, percent up to about 90 mole percent of the combined amount of the (A) reactants employed; and the combined amount of the (B) reactants, i.e., bis(4-beta-hydroxyethoxyphenyl) sulfone and ethylene glycol being about 110 to about 300 mole percent of the combined amount of the (A) reactants. The percentages are based on the reactant feed. Most suitably bis(4-beta-hydroxyethoxyphenyl) sulfone will be employed as a reactant in an amount between about 80 mole percent and about 90 mole percent, based on the combined amounts of the (A) reactants employed. Excellent compositions are produced by employing about 85 mole percent of bis(4-beta-hydroxyethoxyphenyl) sulfone based on the total molar amount of isophthalic acid and, when employed, terephthalic acid. With respect to the isophthalic acid and terephthalic acid, generally it is preferred to employ the isophthalic acid in an amount of between about 40–100, usually 60–100, mole percent and terephthalic acid in an amount between about 60 to zero, usually 40 to zero, mole percent with these percentages being based on the amount of isophthalic and terephthalic acid per se being employed. In passing it should be mentioned that when reference is made to the oxygen and $CO_2$ permeability of poly(ethylene terephthalate) it is generally considered that that homopolymer has an oxygen permeability of about 9 cc.mil/100 in$^2$.day.atm. and a $CO_2$ permeability of about 62 cc.mil/100 in$^2$.day.atm. when measured on unoriented pressed films, and polymers of the present invention have $O_2$ permeabilities of less than 7 cc mil/100 in$^2$ day atm and $CO_2$ permeabilities of less than 52 cc.mil/100 in$^2$.day.atm. when measured on unoriented pressed films. In my copending applications Ser. No. 643,282 and U.S. Ser. No. 643,283 reference is made to a carbon dioxide permeability of around 48 or 50. That figure is based on an extruded film and, as will be readily apparent, extrusion effects some orientation which in turn has the effect of reducing the permeability. Thus the above figures contemplate, as indicated, a pressed film which is substantially unoriented. Generally the glass transition temperature of unoriented poly(ethylene terephthalate) is considered to be about 72° C, and the glass transition temperature of polymers of the present invention is over 75° C.

The polymers of the invention are high polymers suitable for making molded objects such as press-formed containers, and blow molded bottles for carbonated and other beverages; those used for blow molding are high polymers and have an inherent viscosity of at least 0.55, and all have inherent viscosities over 0.4, measured at 25° C using a solution of 0.25 grams of polymer dissolved in 100 milliliters of a mixture of 3 weight parts of phenol and 2 weight parts of 1,1,2,2-tetrachloroethane. All inherent viscosities reported herein were measured under such conditions.

When reference is made herein to bis(4-beta-hydroxyethoxyphenyl) sulfone and to ethylene glycol it is contemplated that this likewise includes esters thereof as being employed for the reactants. Similarly when reference is made to isophthalic acid and/or terephthalic acid, that terminology likewise contemplates not only the acid as the reactant but also the corresponding acid halides and esters, particularly the lower alkyl ($C_1$ to $C_4$) esters of such acids. Preferably in practicing the invention the ethylene glycol and bis(4-beta-hydroxyethoxyphenyl) sulfone will be used as the glycol per se, whereas the diesters of isophthalic acid and, when employed terephthalic acid, will be the preferred (A) reactants. These esters may be the aliphatic esters or aromatic esters with the preferred esters being the alkyl esters having from about 1 to 4 carbon atoms with methyl being especially highly preferred. The phenyl esters are the preferred aromatic esters.

The polyesters as contemplated herein are synthesized by methods generally known in the art for producing polyesters. The reactants may all be reacted in a single operation by first charging them to an appropriate reactor or a sequential operation may be employed by first reacting isophthalic acid and ethylene glycol to form bis(beta-hydroxyethyl) isophthalate and then in turn reacting the latter with the remaining ingredients. Since, as indicated, in the preferred practice the diesters of isophthalic acid and terephthalic acid will be employed, conventional transesterification followed by polycondensation is contemplated as the preferred approach. Temperatures employed which will be quite suitable for forming the polyesters will generally range between about 200° or 210° C. up to about 295° C or so, with the preferred ranges being between about 225° C. to about 285° C. Of course the reaction will be done under an inert atmosphere.

Conventional catalysts are likewise employed; for example, transesterification is effected in the presence of effective catalytic amounts of transition metal compounds, alkaline earth metal compounds, or alkali metal compounds, for example the acetates, oxides, phenoxides, and alkoxides. Specific suitable catalysts will be, for example, zinc acetate, manganese acetate, magnesium acetate, calcium acetate, and titanium alkoxides, like titanium tetrabutoxides. Suitable polycondensation catalysts include for example antimony acetate, antimony trioxide, titanium alkoxide, titanylacetylacetonate, and organotinoxides, for example stannous alkoxides. Usually the catalysts will be present in an amount of about $10^{-5}$ to about $10^{-3}$ moles of catalysts per mole of total acid employed.

Of course suitable adjuvants, such as antioxidants and stabilizers may be employed and they may be added directly to the reaction mass or added to the final polymer.

While the foregoing describes the present invention with sufficient particularity to enable those skilled in the art to make and use same there nonetheless follows, for exemplary purposes only, some specific examples.

EXAMPLE 1

A linear polyester was prepared having the following units in its backbone:

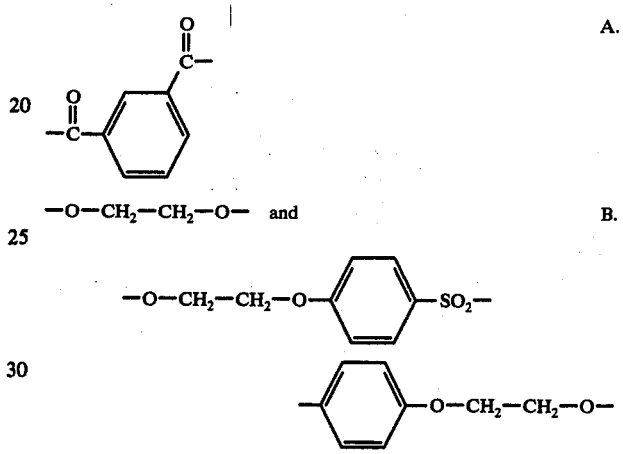

The specific reactant materials employed were about 0.1 mole of dimethyl isophthalate (DMI), about 0.2 mole of ethylene glycol (EG), and about 0.085 mole of bis(4-bata-hydroxyethoxyphenyl) sulfone (BSE). Additionally, about $6.5 \times 10^{-5}$ moles of $Sb_2O_3$ and about $5 \times 10^{-5}$ mole of $Mn(C_2H_3O_2)_2 \cdot 4H_2O$ were employed for catalytic purposes. In this application BSE is also sometimes called ethoxylated 4,4' sulfonyl diphenol.

The mixture of the reactants along with the catalysts were weighed into a 300 ml three-necked round bottom flask equipped with a stirrer, nitrogen inlet tube, and a condenser. The contents of the flask were heated to and held at about 225° C. for about 3 hrs. with nitrogen flowing into the reaction flask to provide a nitrogen blanket and with methanol being removed. The reactant system was then heated to about 265° C. and held there for about 45 minutes during which time additional methanol was removed. A vacuum of about 0.2 to about 0.45 mm Hg was then applied and the reactant heated to between about 275° C. to about 285° C. with ethylene glycol being removed. The system was held at that latter temperature under that vacuum for approximately 6 hours after which time the polymer was removed. Table A sets forth the glass transition temperature of the polymer and as well as the carbon dioxide and oxygen permeability of films which were pressed from that polymer. In Table A the percentages are based on feed stock.

The polymer had an inherent viscosity of 0.43. When the polymerization is repeated for an extended time using the catalyst system of Example 8, the high polymer produced has an inherent viscosity of more than 0.55.

EXAMPLE 2

Into a 300 ml 3-necked round bottom flask, equipped with a nitrogen gas inlet tube, stirrer and a condenser, the following compounds were added:

11.65 g dimethyl isophthalate
7.77 g dimethyl terephthalate
28.76 g ethoxylated 4,4' sulfonyl diphenol
12.4 g ethylene glycol
12.25 mg manganous acetate
14.58 mg antimony trioxide The content of the flask was heated at 225° C. under nitrogen atmosphere for 3 hours and 15 minutes. During this time, methanol was distilled off. The reaction temperature was then raised to 275° C. After 1 hour and 25 minutes at 275° C., the nitrogen flow was stopped and the reaction was continued under vacuum of less than 0.5 mm Hg at 280°–285° C. After 6½ hours, the reaction was stopped. The inherent viscosity of the copolyester was 0.50. When the polymerization is repeated using the catalyst system of Example 8 (zinc acetate dihydrate and titanyl acetylacetonate) the high polymer produced has an inherent viscosity of over 0.55.

In Table A, $O_2$ and $CO_2$ respectively refer to the oxygen permeability and carbon dioxide permeability of pressed films as measured by ASTM D-1434-66 at about 73° F. and 50% relative humidity in cc.mil/100 in$^2$.day.atm. and Tg represents the glass transition temperature as measured with a Differential Scanning Calorimeter.

EXAMPLE 3

Into a 300 ml 3-necked round bottom flask, equipped with a nitrogen gas inlet tube, stirrer and a condenser, the following compounds were added:

9.71 g dimethyl isophthalate
9.71 g dimethyl terephthalate
16.92 g ethoxylated 4,4' sulfonyl diphenol
13.02 g ethylene glycol
65.17 mg zinc acetate dihydrate The content of the flask was heated at 210°–218° C under nitrogen atmosphere for 3 hours and 35 minutes. During this time, methanol was distilled off. Then 56.8 mg of bismuth acetate was added. The reaction temperature was raised to 240° C. After 45 minutes, the nitrogen flow was stopped and the reaction was continued under vacuum of less than 0.5 mm Hg at 265°–275° C. After 4 hours, the reaction was stopped and 46 mg of triphenyl phosphite was added. The inherent visosity of the copolyester was 0.59, and other properties are shown in Table A.

EXAMPLE 4

Into a 300 ml 3-necked round bottom flask, equipped with a nitrogen gas inlet tube, stirrer and a condenser, the following compounds were added:

29.13 g dimethyl isophthalate
7.61 g bis(4-beta-hydroxyethoxyphenyl) sulfone
21.86 g ethylene glycol
0.18 g titanium tetrabutoxide The content of the flask was heated at 195°–205° C. under nitrogen atmosphere for 4 hours. During this time, methanol was distilled off. Then the reaction temperature was raised to 250° C. After 30 minutes, the nitrogen flow was stopped and the reaction was continued under vacuum of less than 0.5 mm Hg at 250° C. Excess ethylene glycol was continuously distilled off. The inherent viscosity of the copolyester was 0.55, and the other properties were as shown in Table A.

EXAMPLE 5

Into a 300 ml 3-necked round bottom flask, equipped with a nitrogen gas inlet tube, stirrer and a condenser, the following compounds were added:

19.42 g dimethyl isophthalate
16.92 g bis(4-beta-hydroxyethoxyphenyl) sulfone
12.4 g ethylene glycol
0.1702 g titanium tetrabutoxide The content of the flask was heated at 195°–225° C. under nitrogen atmosphere for 3 hours. During this time, methanol was distilled off. Then the reaction temperature was raised to 270° C. After 45 minutes, the nitrogen flow was stopped and the reaction was continued under vacuum of less than 0.5 mm Hg at 255° C. After 5½ hours, the reaction was stopped. The inherent viscosity of the copolyester was 0.56, and the other properties were as shown in Table A.

EXAMPLE 6

The procedure of Example 5 was substantially repeated but with the different ratios of reactants that are shown in Table A. The inherent viscosity of the polymer was 0.56, and the other properties were as indicated in Table A.

EXAMPLE 7

Into a 300 ml 3-necked round bottom flask, equipped with a nitrogen gas inlet tube, stirrer and a condenser, the following compounds were added:

7.28 g dimethyl isophthalate
16.99 g dimethyl terephthalate
38.06 g ethoxylated 4,4' sulfonyl diphenol
15.50 g ethylene glycol
13.72 mg zinc acetate
18.22 mg antimony trioxide The content of the flask was heated at 215° C. under nitrogen atmosphere for 2 hours. During this time, methanol was distilled off. The reaction temperature was then raised to 265° C. After 1 hour, the nitrogen flow was stopped and the reaction was continued under vacuum of less than 0.5 mm Hg at 285° C. After 4 hours, the reaction was stopped. The inherent viscosity of the copolyester was 0.46, when measured in the manner before described. The other properties were as shown in Table A. When the polymerization is repeated using the catalyst system of Example 8 (zinc acetate and titanyl acetylacetonate) the high polymer produced has an inherent viscosity of over 0.55.

EXAMPLE 8

Into a 300 ml 3-necked round bottom flask, equipped with a nitrogen gas inlet tube, stirrer and a condenser, the following compounds were added:

2.91 g dimethyl isophthalate
16.51 g dimethyl terephthalate 16.92 g ethoxylated 4,4' sulfonyl diphenol
13.02 g ethylene glycol
65.17 mg zinc acetate dihydrate The content of the flask was heated at 190°-215° C. under nitrogen atmosphere for 3 hours. During this time, methanol was distilled off. Then 0.1526 g titanyl acetyl acetonate was added. The reaction temperature was raised to 275° C. After 1 hour and 25 minutes the nitrogen flow was stopped and the reaction was continued under vacuum of less than 0.5 mm Hg at 275° C. After 2 hours, the reaction was stopped. The inherent viscosity of the copolyester was 0.59, and the other properties were as shown in Table A.

COMPARATIVE EXAMPLES 9, 10 & 11

The procedure described in Example 1 was generally followed but no dimethyl isophthalate was employed. In Examples 9 & 10 the molar amount of constituent A was solely supplied by dimethyl terephthalate. Additionally in Examples 9 & 10 the percent of bis(4-beta-hydroxyethoxyphenyl) sulfone employed was first about 70% (Example 9) based on the dimethyl terephthalate in accordance with the general teachings of the above-referred to Japanese Showa publication No. 50-51595 and in Example 10 the percent of bis(4-beta-hydroxyethoxyphenyl) sulfone was 50% which is the same amount employed in Comparative Example 1 of that Japanese Publication. Table B below summarizes the oxygen permeability, the carbon dioxide permeability, and the glass transition temperatures of those two polyesters. Example 11 also relates to that Japanese Publication by employing 85 mole percent of dimethyl terephthalate as a constituent and, from the list of optional dicarboxylic acids of that Japanese Publication, the dimethyl ester of diphenyl sulfone dicarboxylic acid (DMS) was employed in an amount of 15 mole percent. Table B shows the oxygen and carbon dioxide permeabilities of that polyester and its glass transition temperature. As will be readily apparent from Table B, illustrating the inferior permeability characteristics of the polyesters of Examples 9, 10, & 11, there is no recognition in the Japanese Publication of the present inventive concept.

EXAMPLE 12

Polyethylene terephthalate was prepared as follows:
Into a 500 ml 3-necked round bottom flask, equipped with a nitrogen gas inlet tube, stirrer and a condenser, the following compounds were added:

46.5 g dimethyl terephthalate
35.4 g ethylene glycol
0.0263 g zinc acetate dihydrate
0.01398 g antimony trioxide The content of the flask was heated at 220° C. under nitrogen atmosphere for 3 hours. During this time, methanol was distilled off. Then the reaction temperature was raised to 280° C., nitrogen flow was stopped and vacuum was gradually applied until less than 0.5 mm Hg. Excess ethylene glycol was continuously distilled off. The reaction was stopped after 4 hours. The inherent viscosity was 0.83, the glass transition temperature was 72° C., the oxygen permeability was 9.3 cc.mil/100 in$^2$.day.atm. and the carbon dioxide permeability was 62 cc.mil/100.in$^2$.day.atm.

It will be seen that BSE generally increases the $CO_2$ permeability of either the terephthalate-glycol polyesters when added as a third monmer. According to the present invention, however, BSE added to the isophthalate or the isophthalateterephthate polymer reaction mixtures with ethylene glycol produces polymers with appreciably lower permeabilities than PET and yet higher glass transition temperature than that polyester.

TABLE A

| Example | % DMI | % DMT | % BSE | Mole Ratio of EG/BSE | $O_2$ | $CO_2$ | Tg |
|---|---|---|---|---|---|---|---|
| 1 | 100 | 0 | 85 | 70/30 | 4.5 | 21.9 | 112° C. |
| 2 | 60 | 40 | 85 | 70/30 | 5.9 | 38.5 | 117° C. |
| 3 | 50 | 50 | 50 | 81/19 | 5 | 38 | 105° C. |
| 4 | 100 | — | 15 | 94/6 | 2.6 | 14.2 | 78° C. |
| 5 | 100 | — | 50 | 80/20 | 3.5 | 16.9 | 98° C. |
| 6 | 100 | — | 70 | 74/26 | 4.0 | 22.7 | 104° C. |
| 7 | 30 | 70 | 90 | 70/30 | — | 54 | 117° C. |
| 8 | 15 | 85 | 85 | 70/30 | 7.2 | 56 | 121° C. |

TABLE B

| Example | % DMT | % DMS | % BSE | Mole Ratio of EG/BSE | $O_2$ | $CO_2$ | Tg |
|---|---|---|---|---|---|---|---|
| 9 | 100 | — | 70 | 74/26 | 9.0 | 75.0 | 119° C. |
| 10 | 100 | — | 50 | 80/20 | 9.6 | 77.9 | 115° C. |
| 11 | 85 | 15 | 85 | 70/30 | 8.9 | 86 | 124° C. |

As will be evident to those skilled in the art, various modifications of this invention can be made or followed in the light of the foregoing disclosure and discussion without departing from the spirit and scope of the disclosure or from the scope of the claims.

I claim:

1. As a composition of matter, a linear copolyester suitable for use as a beverage bottle, said polyester having a glass transition temperature higher than that of poly(ethylene terephthalate) and over 75° C. and having $O_2$ and $CO_2$ permeabilities, respectively, of less than 7 and less than 52 cc.mil/100 in$^2$.day.atm., said copolyester being the polymeric reaction product of reactants consisting essentially of:

A. isophthalic acid and, optionally, terephthalic acid and,
   B. bis(4-beta-hydroxyethoxyphenyl) sulfone and ethylene glycol,
   the amount of said A reactants being between about 40 to 100 mole percent of isophthalic acid and between about 60 to zero mole percent terephthalic acid, the amount of said bis(4-beta-hydroxyethoxyphenyl) sulfone being at least 15 and up to about 90 mole percent of the combined amount of said A reactants; and the combined amounts of said B reactants being about 110 to about 300 mole percent of the combined amounts of said A reactants.

2. The composition of claim 1 wherein the amount of said isophthalic acid is about 60 to 100 percent and the amount of said terephthalic acid is about 40 to zero percent of the A reactants.

3. The composition of claim 1 wherein the amount of said bis(4-beta-hydroxyethoxyphenyl) sulfone is between about 20 to about 90 mole percent of the A reactants.

4. The composition of claim 2 wherein the amount of said bis(4-beta-hydroxyethoxyphenyl) sulfone is between about 80 to 90 mole percent of the A reactants.

5. As a composition of matter, a linear copolyester suitable for use as a beverage bottle, said polyester having a glass transition temperature higher than that of poly(ethylene terephthalate) and an $O_2$ and $CO_2$ permeability lower than that of poly(ethylene terephthalate) and being the polymeric reaction product of reactants consisting essentially of:
A. isophthalic acid and, optionally, terephthalic acid and,
B. bis(4-beta-hydroxyethoxyphenyl) sulfone and ethylene glycol, the amount of said A reactants being between about 50 to 100% (mole) of isophthalic acid and between about 50 to 0% terephthalic acid, the amount of said bis(4-beta-hydroxyethoxyphenyl) sulfone being about at least 20% and up to about 90% (mole) of the combined amount of said A reactants and the combined amounts of said B reactants being about 110 to about 300% (mole) of the combined amounts of said A reactants.

* * * * *